United States Patent
Chen

(10) Patent No.: US 6,749,782 B2
(45) Date of Patent: Jun. 15, 2004

(54) FORMING METHOD OF A FOAM BOARD

(75) Inventor: Ching Hsi Chen, Taichung (TW)

(73) Assignee: Sun Own Industrial Co., Ltd., Changhua (TW)

( * ) Notice: Subject to any disclaimer, the term of this patent is extended or adjusted under 35 U.S.C. 154(b) by 145 days.

(21) Appl. No.: 10/202,841

(22) Filed: Jul. 26, 2002

(65) Prior Publication Data

US 2004/0017024 A1 Jan. 29, 2004

(51) Int. Cl.$^7$ .............................................. B29C 44/06
(52) U.S. Cl. ................... 264/46.5; 264/46.6; 264/257; 264/321
(58) Field of Search ............................. 264/46.5, 46.6, 264/257, 321

(56) References Cited

U.S. PATENT DOCUMENTS

| | | | |
|---|---|---|---|
| 3,936,565 A | * | 2/1976 | Good ..................... 428/314.8 |
| 5,112,663 A | * | 5/1992 | Morenz et al. ............... 428/71 |
| 5,288,097 A | * | 2/1994 | Pascal et al. ............... 280/610 |
| 5,401,456 A | * | 3/1995 | Alesi et al. .................. 264/511 |
| 5,494,737 A | * | 2/1996 | Sakai et al. ............... 428/317.9 |
| 5,688,454 A | * | 11/1997 | Chi ............................. 264/129 |

FOREIGN PATENT DOCUMENTS

WO WO 02/074843 * 3/2001 ............. C08J/9/34

* cited by examiner

*Primary Examiner*—Allan R. Kuhns
(74) *Attorney, Agent, or Firm*—Troxell Law Office PLLC

(57) ABSTRACT

A forming method of a foam board includes a hard plastic top plate and a hard plastic bottom plate provided respectively on and under a foam board placed in a mold. In a forming process by heating, the peripheral edges of the hard plastic top and the bottom plate respectively bend downward and upward automatically and extend to stick on the peripheral side edge of the foam board and fusing and adhering with each other to make up an integral peripheral edge so as to elevate the rigidity and safety of the foam board and enable it endure grinding.

3 Claims, 5 Drawing Sheets

FORMING METHOD OF A FOAM BOARD

BACKGROUND OF THE INVENTION

This invention relates to a forming method of a foam board, particularly to one having a foam board wrapped up by a hard plastic upper plate and a hard plastic lower plate so as to elevate the rigidity and safety of the foam board.

A conventional foam board is a plastic foam body made of ethylene vinyl acetate copolymer (EVA) or polyethylene resins, light and having good buoyancy as well as easy to be carried about, and able to be made into a large area with low cost so it is widely employed to make a surfboard, a skiing board, a grass skateboard, a sand skateboard or the like for various open-air exercises.

However, a foam board is substantially a foam body with high magnifying power and cannot endure grinding so it is liable to be damaged in case of rubbing against a sandy ground or a stony ground. In view of this property, a hard bottom plate is additionally employed to glue on the bottom side of a foam board, but the top surface and the side edge of the foam board has no hard plate for protection. Thus, when sliding fast on a steep slope, a grass skateboard or a sand skateboard will most likely be bumped or overturned, and its edge will be damaged first. In other words, if the edge of a foam board is not strong enough, it cannot bear a quick rushing force to protect a user, and if the whole body of a foam board is not rigid enough, it is liable to bend, resulting in overturning.

Besides, the tip and the peripheral edge of a foam board are mostly turned up in an arcuate shape in order to let the foam board slide smoothly and controlled alertly. Further, its peripheral edge is cut in an arc-shape for the convenience of gripping and sliding. In this case, it is not easy to manually glue a hard plate on the peripheral edge of the foam board, and even if a hard plate is attached on the peripheral edge of the foam board, it cannot fixedly be glued with the hard bottom plate of the foam board, consequently easy to cause damage at the contacting edge between the hard side plate and the hard bottom plate.

SUMMARY OF THE INVENTION

The main objective of the invention is to offer a forming method of a foam board, provided with a hard plastic top plate and a hard plastic bottom plate respectively on and under a foam board and having the circumferential edges of the hard plastic top and the bottom plate automatically bend and extend to stick on the peripheral edge of the foam board and make up an integral side edge to wrap up the entire foam board to increase the rigidity and security of the foam board.

Another objective of the invention is to offer a forming method of a foam board by means of a mold in which a net layer, a hard plastic bottom plate, a foam board, and a hard plastic top plate are laid on one another orderly. Further, the hard plastic top plate or the hard bottom plate has a peripheral edge bending downward or upward and extending to stick around the edge of the foam board. Thus all of the materials are all formed integral into a finished foam board with one round of processing, elevating producing efficiency and having effect of forming a foam board without using glue or the like.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
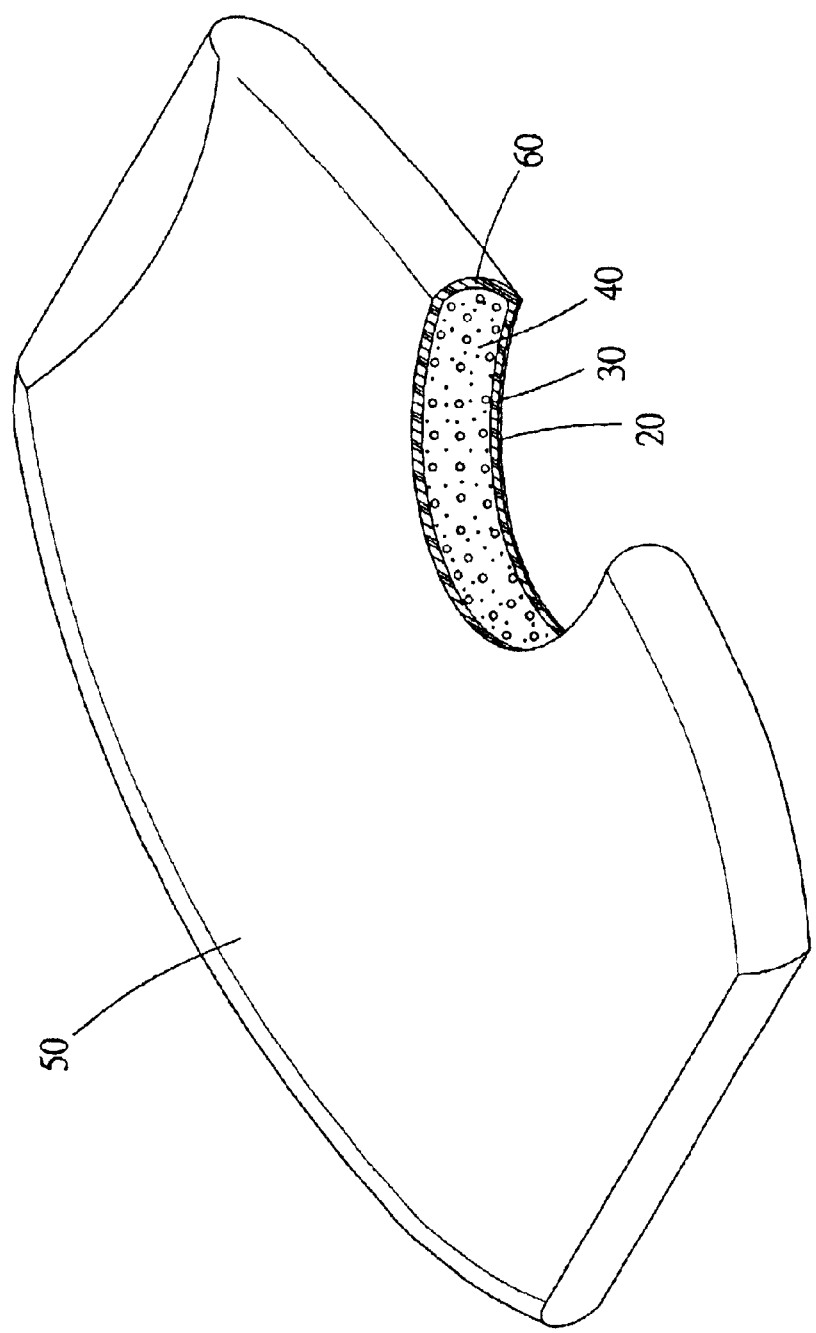
FIG. 1 is a partial cross-sectional and perspective view of a foam board made by a first embodiment of a forming method of a foam board in the present invention.
Figure 2:
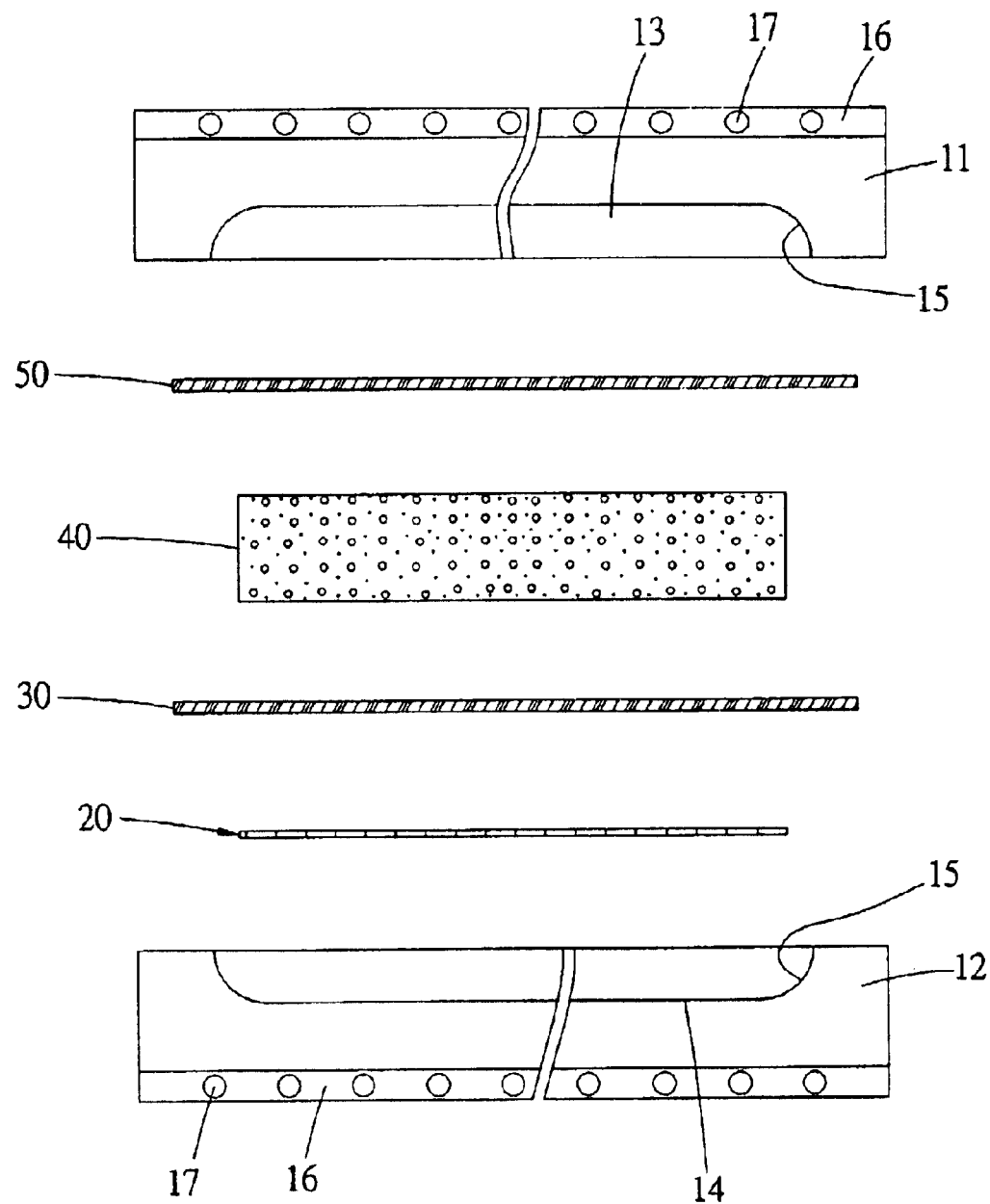
FIG. 2 is an exploded perspective view of a mold and materials used in the first embodiment of a forming method of a foam board in the present invention.

A preferred embodiment of a forming method of a foam board in the present invention, as shown in FIGS. 1 and 2, includes the following steps.

1. A first step of preparing a mold composed of an upper mold 11 and a lower mold 12. The upper mold 11 and the lower mold 12 are respectively formed with an upper mold recess 13 and a lower mold recess 14 to correspond to the upper mold recess 13. The upper and the lower mold recess 13 and 14 respectively have a preset shape designed to match with the appearance of a product to be formed.

The upper and the lower mold recess 13 and 14 are respectively formed with a peripheral edge 15 and respectively provided with a heater 16 on the outer surface. Each heater 16 is filled with heating energy such as steam flowing through or electric heating tubes placed in a plurality of holes 17 at predetermined positions of the mold.

2. A second step of depositing a net layer 20 in the lower mold recess 14 of the lower mold 12. The net layer 20 is a linear material made of plastic or plant fiber, having numerous preset-size net holes formed by weaving, drilling or the like. The area of the net layer 20 in this embodiment is equal to that of the bottom surface of the lower mold recess 14.

3. A third step of placing a hard plastic bottom plate 30 made of EVA or PE or the mixture of EVA and PE on the net layer 20, having an area in this embodiment approximately equal to that of the lower mold recess 14 plus its peripheral edge 15.

4. A fourth step of placing a foam board 40 made of EVA or PE or a mixture of EVA and PE and having a preset size on the hard plastic bottom plate 30.

5. A fifth step of positioning a hard plastic top plate 50 on the foam board 40. The top plate 50 in this embodiment has an area somewhat equal to that of the upper mold recess 13 plus its peripheral edge 15. The thickness of the foam board 40 together with the hard plastic bottom plate 30 and the hard plastic top plate is larger than the total height of the upper and the lower mold recess 13 and 14 by about 5%–15%, the difference of size depending on the material compressed and deformed as well as inflated by heating to fill up the mold recesses 13 and 14.

Figure 3:
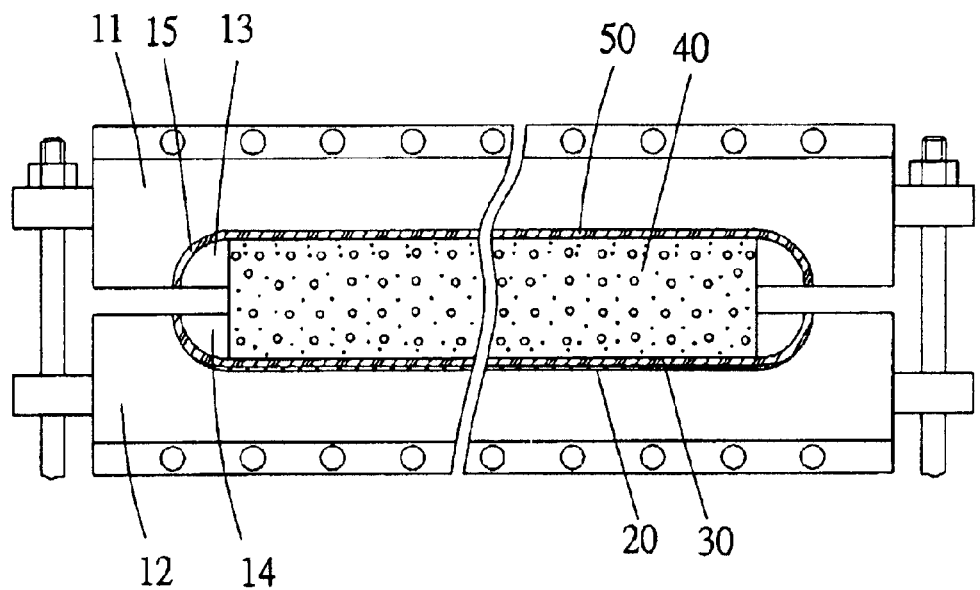
FIG. 3 is a cross-sectional view of the mold for forming a foam board in a not-closed condition in the first embodiment of a forming method of a foam board in the present invention.

6. A sixth step of heating the upper mold 11 and the lower mold 12 and closing the two molds 11, 12 together, as shown in FIG. 3. In the process of heating, the circumferential edges of the hard plastic bottom and the top plates 30 and 50 are softened by degrees and stick on the peripheral edges of the upper and the lower mold recess 13 and 14. After the upper and the lower mold 11 and 12 are tightly closed together, a portion of the dimensions of the foam board 40, which is a little higher than the total height of the upper and the lower mold recess 13 and 14, will be pressed down, and part of it will be squeezed out to flow to the space formed at the peripheral edges of the upper and the lower mold recess 13 and 14.

Figure 4:
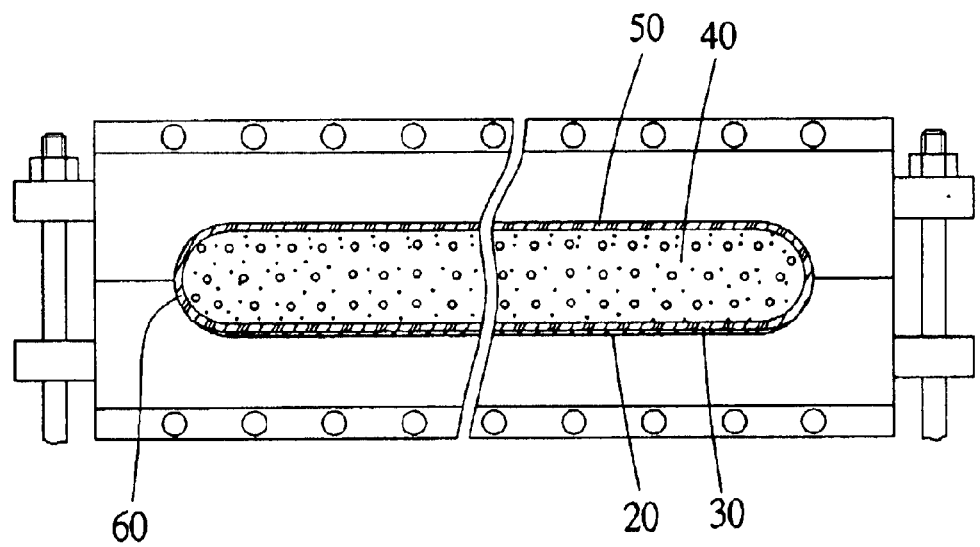
FIG. 4 is a cross-sectional view of the mold for forming a foam board in a closed and heated condition in the first embodiment of a forming method of a foam board in the present invention.

Then, the upper and lower molds 11 and 12 are heated for a period of preset time (about 3–15 minutes) within a preset temperature (about 120° C.–180° C.) to let the foam board 40 and the hard plastic bottom plate 30 melted, with their contacting portions fused and adhered with each other. Simultaneously, the foam board 40 in the closed mold recesses 13 and 14 is heated to make its interior air inflated to push its outer circumferential melted portion to flow into the gap of the mold recesses 13 and 14, fully filling up the whole cavity formed by the two mold recesses 13, 14. Meanwhile, the peripheral edges of the hard plastic bottom and the top plates 30 and 50 respectively expand outward and stick to the peripheral edges 15 of the upper and the lower mold recess 13 and 14, as shown in FIG. 4.

Figure 5:
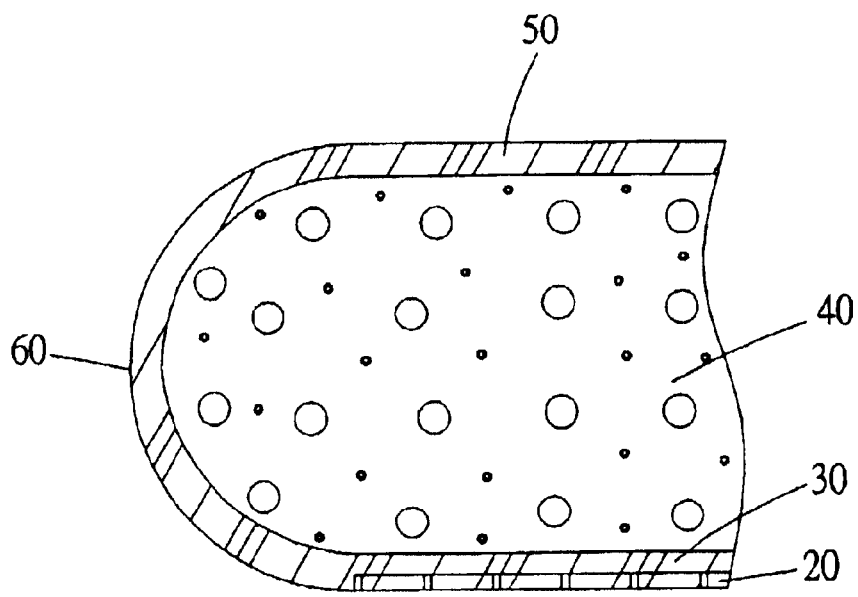
FIG. 5 is a partial cross-sectional view of a foam board formed by the first embodiment of a forming method of a foam board in the present invention.
Figure 6:
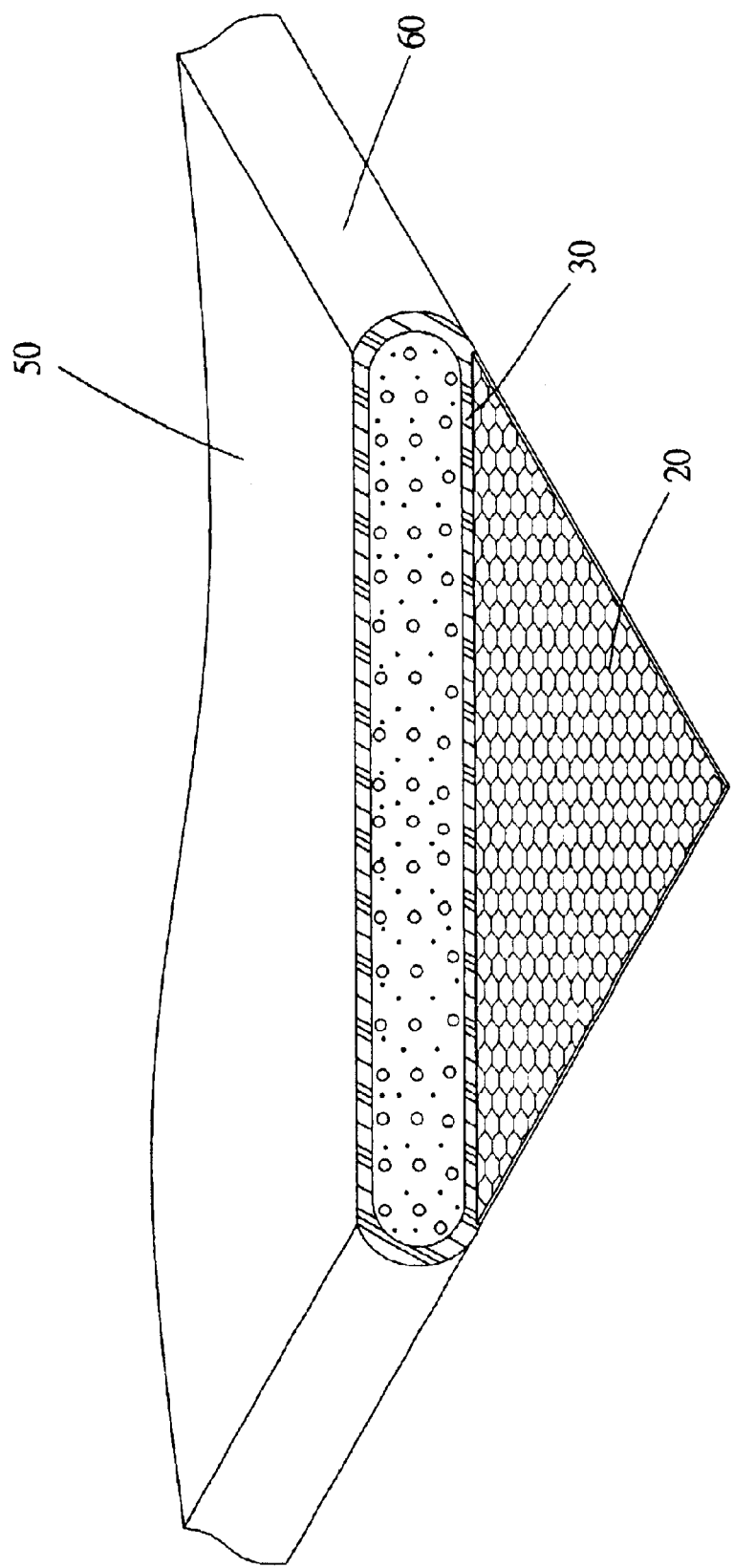
FIG. 6 is a partial cross-sectional and perspective view of the foam board formed by the first embodiment of a forming method of a foam board in the present invention: and, FIG. 7 is a cross-sectional view of a foam board formed by a second embodiment of a forming method of a foam board in the present invention.

As the hard plastic bottom and the top plate 30 and 50 are made of the same plastic material, they can be well fused together and so they will have a great strength after fusing together under a melted condition. In addition, the foam body expands outward to force the peripheral edges of the hard plastic bottom and top plate 30 and 50 to bend down and extend to stick on the outer peripheral edges of the upper and lower mold recess 13 and 14 and combined with each other to make up an integral peripheral edge 60 and wrap up the entire foam board 40, as shown in FIGS. 5 and 6.

7. A seventh step. After heating and fusing, releasing the interior steam out of the holes 17 and then pouring in cool water to let the softened plastic bottom and the softened top plates 30 and 50 harden inside the cool mold.

8. An eighth step. The mold is opened for taking out a finished foam board having the hard plastic bottom and the hard top plates 30 and 50 completely fused together and wrapping up the foam board 40 in an integral condition as shown in FIG. 1.

Further, when the mold is heated and the hard plastic bottom plate 30 melts, the melted plastic will fill up all the holes of the net layer 20 under the hard plastic bottom plate 30, and part of it will flow through the holes and get to the bottom surface of the lower mold recess 14 to make up another hard plastic bottom surface after cooled and removed out of the mold. Thus, the net layer 20 is completely embedded in the interior of the lower half portion of the hard plastic bottom plate 30 to reinforce the structure of the foam board 40.

Figure 7:
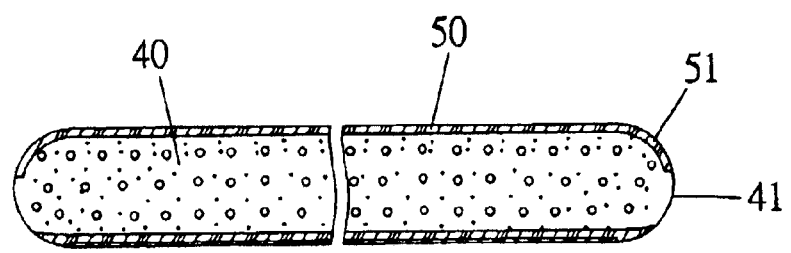

A second preferred embodiment of a forming method of a foam board in the present invention, as shown in FIG. 7, includes almost the same steps as the first preferred embodiment, except that the peripheral edge 51 of the hard plastic top plate 50 bends downward and extend to stick on the edge 41 of the foam board 40, with the peripheral edge of the hard plastic bottom plate 30 not bending nor extending upward but located at the bottom side of the foam board 40. Thus, although the peripheral edge of the foam board 40 is not entirely wrapped up, yet the side edge 51 formed integral with the plastic top plate 50 and extending downward can equally increase the rigidity of the foam board 40 and let a user grip the foam board steadily and comfortably.

Specifically, one technique employed in this invention is to have a hard plastic top and a hard plastic bottom plate 50 and 30 respectively provided on and under the foam board 40 and respectively having the peripheral edge bend downward and upward and extend to stick on the side edge of the foam board 40 to make up an integral peripheral edge 60 and wrap up the entire foam board 40 in the process of forming by heating in a mold. Thus, it is possible to elevate the rigidity and safety of the foam board 40, enabling the foam board to endure grinding and bumping, and preventing the foam board 40 from bending or overturned.

Another technique applied in this invention is to carry out forming in a mold, in which the net layer 20, the hard plastic bottom plate 30, the foam board 40, the hard plastic top plate 50, and the peripheral edges of the hard plastic top and bottom plates 50 and 30 respectively bending downward and upward to extend and stick on the side edge 60 of the foam board 40 are all formed integral with one round of process. By such processing, the material ingredients of the portions contacting with each other can naturally be fused and become integral, able to produce a great strength and needless to use glue or the like for adhering.

While the preferred embodiments of the invention have been described above, it will be recognized and understood that various modifications may be made therein and the appended claims are intended to cover all such modifications that may fall within the spirit and scope of the invention.

I claim:

1. A forming method of a foam board comprising:
   (A). A first step of preparing a mold composed of an upper mold and a lower mold, said upper mold formed with an upper mold recess, said lower mold formed with a lower mold recess, said upper and said lower mold recess respectively having a preset shape to face correspondingly each other, said upper and lower mold recess respectively formed with a peripheral edge:
   (B). A second step of placing a hard plastic bottom plate on a top surface of said lower mold recess:
   (C). A third step of depositing a foam board on said plastic bottom plate, said foam board made of EVA or PE and having a predetermined size:
   (D). A fourth step of placing a hard plastic top plate on said foam board, said hard plastic top plate having its area extending and covering a preset compass of said peripheral edge of said upper mold recess:
   (E). A fifth step of heating said upper and said lower molds with a preset temperature, and closing them together by degrees, the peripheral edge of said hard plastic top plate gradually becoming softened and closely contacting said peripheral edge of said upper mold recess, the air in the interior of said foam board being inflated to produce interior pressure, said interior pressure forcing an outer peripheral melted portion of said foam board to flow into a gap of said mold recesses and fill up an entire cavity of said two mold recesses:
   (F). A sixth step of carrying out cooling of said mold after heating for a period of preset time and letting said foam board together with said top and said bottom plate in said mold harden and being removed from said mold as a finished product.

2. The forming method of a foam board as claimed in claim 1, wherein said hard plastic bottom plate has its area extending to cover a preset compass of said peripheral edge of said lower mold recess and adhering with said peripheral edge of said hard plastic top plate to make up an integral peripheral edge and cover up said foam board completely.

3. The forming method of a foam board as claimed in claim 1, wherein a net layer made of plastic or plant fiber, having numerous preset-size net holes made by weaving, punching, or the like way, is placed in advance under said hard plastic bottom plate on said lower mold recess.

* * * * *